United States Patent [19]
Minaguchi et al.

[11] Patent Number: 5,754,375
[45] Date of Patent: May 19, 1998

[54] ROTARY CYLINDER POWER FEEDING APPARATUS

[75] Inventors: Hiroyuki Minaguchi; Yuuji Takaiwa, both of Saitama-ken, Japan

[73] Assignee: Kabushiki Kaisha Toshiba, Kawasaki, Japan

[21] Appl. No.: 779,646

[22] Filed: Jan. 15, 1997

Related U.S. Application Data

[63] Continuation of Ser. No. 361,365, Dec. 22, 1994, abandoned.

[30] Foreign Application Priority Data

Dec. 24, 1993 [JP] Japan .................................. 5-328917
Nov. 22, 1994 [JP] Japan .................................. 6-288391

[51] Int. Cl.$^6$ .............................. G11B 5/52; G11B 21/04; G11B 21/18
[52] U.S. Cl. ............................................. 360/108; 360/107
[58] Field of Search .............................. 360/108, 64, 107; 310/232, 233, 143; 464/100, 101

[56] References Cited

U.S. PATENT DOCUMENTS

| | | | |
|---|---|---|---|
| 3,445,608 | 5/1969 | Kinjo | 360/108 |
| 3,464,233 | 9/1969 | Brovwers | 464/101 |
| 4,926,273 | 5/1990 | Tabuchi et al. | 360/108 |
| 4,991,211 | 2/1991 | Cap et al. | 360/84 |
| 5,049,772 | 9/1991 | Mottier et al. | 310/233 |
| 5,070,424 | 12/1991 | Ono et al. | 360/108 |
| 5,295,033 | 3/1994 | Ibaraki | 360/108 |

OTHER PUBLICATIONS

Patent Abstracts of Japan, vol. 011, No. 201, 30 Jun. 1987, JP-A-62 022223.

Primary Examiner—John H. Wolff
Assistant Examiner—Adriana Giordana
Attorney, Agent, or Firm—Cushman, Darby & Cushman IP Group of Pillsbury, Madison & Sutro LLP

[57] ABSTRACT

A rotor rotating integrally with the rotary cylinder is rotatably fitted to a supporting member. A conductive member is arranged on the outer peripheral surface of this rotor. A conductive connecting terminal connectable with the power generating part is arranged at one end of the supporting member and a conductive brush for feeding voltage from the power source generating part to the electronic circuit through the above mentioned conductive member is arranged at the other end of the supporting member. By fitting the supporting member to the chassis without using lead wires and soldering, the power source voltage from the power generating part will be able to be fed to the electronic circuit within the rotary cylinder and the power feeding apparatus will be able to be very easily fitted to the rotary cylinder. Further, a center angle of one conductor of a plurality of conductors forming the conductive members is formed to be larger than the tape winding angle on the rotary cylinder and the lead wires and connectors are arranged near the magnetic head. Therefore, the joint between the plurality of conductors does not contact the conductive brush when the magnetic head is in contact with the magnetic tape, so that electronic noise generated when the joint between the conductors contacts the conductive brush will not affect the recorded and reproduced signals.

6 Claims, 10 Drawing Sheets

FIG.15(a) DETECTED SIGNAL OF HEAD 5a

FIG.15(b) DETECTED SIGNAL OF HEAD 5b

FIG.15(c) SYNTHESIZED SIGNAL

FIG.15(d) ELECTRIC NOISE

ROTARY CYLINDER POWER FEEDING APPARATUS

This is a continuation of application Ser. No. 08/361,365, filed on Dec. 22, 1994, which was abandoned upon the filing hereof.

BACKGROUND OF THE INVENTION

1. Field of the Invention

This invention relates to rotary cylinder power feeding apparatus to be used for such magnetic recording and reproducing apparatus as, for example, video tape recorders (which shall be mentioned as VTR hereinafter) and more particularly to a rotary cylinder power feeding apparatus which is formed by facilitating the work of assembling a commutator forming a rotary cylinder power feeding apparatus and integrating such conductive members as the above mentioned commutators and brushes for feeding power to an electronic circuit within the rotary cylinder from the body so that efficiency, electric performance and reliability as of the apparatus may be improved.

2. Description of the Related Art

Generally, in magnetic recording and reproducing apparatus such as a VTR, a helical scanning system is used wherein a head is rotated to make a magnetic memory or reproduction.

In a VTR with such a helical scanning system, for example, during reproduction, when at least two heads fitted on a rotary drum are rotated to slide helically against the running direction on a magnetic memorizing medium in which a signal has been magnetically memorized, the signal will be obtained from this magnetic memorizing medium, amplified to a predetermined level by an electronic circuit cush as a reproducing amplifier, and fed to a reproducing circuit through a contactless rotary transformer (which shall be mentioned as a rotary transformer hereinafter) so as to be reproduced. Also, during recording in a VTR, the signal to be memorized will be fed through the rotary transformer, the voltage and current required for the recording will be fed to the above mentioned head by a electronic circuit, such as a recording amplifier, and the head will rotate to slide helically on the above mentioned recording medium to magnetically memorize the signal.

In a VTR, as the rotary transformer is interposed between the magnetic head and the circuit feeding the signal to be recorded to this magnetic head or amplifying the signal reproduced by the head, the signal transmitting loss will be large. Various suggestions have been already made as to how this loss should be reduced. One of the suggestions is, as described above, to arrange an electronic circuit to include a reproducing amplifier or recording amplifier between the rotary transformer and magnetic head.

When an amplifier is provided between the rotary transformer and the magnetic head as mentioned above, it is necessary to feed power to the amplifier when a signal is reproduced or recorded, in order to amplify the reproduced signal or recorded signal from the magnetic head. However, in such case, the amplifier will be arranged within the rotary cylinder and will rotate together with the rotary cylinder. Therefore, in order to always securely feed power to the amplifier, an apparatus is required which is capable of feeding power from the body of the VTR to the preamplifier electronic circuit of the rotary cylinder, that is, a so-called rotary cylinder power feeding apparatus.

A rotary cylinder power feeding apparatus of this nature generally includes a commutator as a conductive member which has two positive and negative pole devices connected through lead wires with the electronic circuit of the amplifier provided within the rotary cylinder. The power feeding apparatus is axially fitted to the shaft of the rotary cylinder through a connecting and fixing member (which shall be mentioned as a coupling hereinafter) and rotates together with the rotary cylinder, and has positive pole and negative pole conductive members (which shall be mentioned as conductive brushes or merely brushes hereinafter) which are arranged to correspond respectively to the positive and negative poles of the rotating commutator and will feed power from the body when they contact the respective outer peripheries of the commutator.

The commutator is generally formed of a stay and a cylindrical conductive member fitted to this stay. This cylindrical conductive member is arranged to contact the positive and negative pole brushes on the outer periphery of the stay and is formed by pressing. When the stay of the commutator is fitted with a coupling fixed on the upper surface of the rotary cylinder to rotate coaxially with the above mentioned rotary cylinder, it will be positioned coaxially with the rotary cylinder.

The brush is generally formed by having the positive and negative pole conductive members fitted to a supporting member. This brush supporting member is made to contact the rotating positive and negative commutators with a predetermined contact pressure by an arm fixed to a main base and is held in a predetermined position.

The commutators and such preamplifier electronic circuit arranged within the rotary cylinder are connected by lead wires, such that the commutators are connected by a connector through lead wires from the lower ends of the commutators. The connector is connected to a connector connecting hole provided on the upper surface of the rotary cylinder. Alternatively, the connector connecting hole on the upper surface of the rotary cylinder may be provided with a connecting device connected with the electronic circuit part as of the preamplifier provided within the rotary cylinder. When the connector is inserted into this connecting device, the power from body will be fed to the electronic circuit of the preamplifier through the above mentioned brush, commutator and connector.

However, in the conventional rotary cylinder power feeding apparatus because the commutator used for the rotary cylinder power feeding apparatus is formed by simultaneously inserting a cylindrically formed commutator onto the commutator shaft (which is fitted to the rotary cylinder shaft) and pressing it onto the shaft, assembly is complicated and the cost is high. Also, in order to cylindrically form the commutator, the type of material used as the conductive member is limited. Further, the conductive member must be formed by a special producing method and therefore its productivity will be greatly influenced.

Also, the commutator shaft must be directly fixed to the rotary cylinder or a connecting member must be used to couple the commutator shaft so that it is axially fitted within the rotary cylinder. However, in the case of this fixing and fitting work, the commutator shaft will have to be coaxially fitted to the above mentioned rotary shaft and, at the same time, the contact position in the vertical direction with the above mentioned brush will have to be determined. As a result, the assembling work will be complicated and the productivity will be greatly influenced.

Further, the above mentioned commutator and the preamplifier electronic circuit arranged within the rotary cylinder have been connected with each other by means of a connector connecting them through the above mentioned commutator and lead wires. However, in this connecting method, the vicinity of the connector connecting hole on the upper surface of the rotary cylinder is so precisely formed that the fitting work is complicated. Additionally, the fitted lead wire type connector will rotate at a high speed with the rotary cylinder. Therefore, problems occur with contact or entanglement of the wires with the rotary cylinder or breakage of the lead wires and the lead wires must be bound to prevent such trouble. When the connection between the wire type connector arranged in the connecting hole and the preamplifier electronic circuit is made by using another connector, such as when the lead wire type connector is used simultaneously, there will be two connections and the connecting and assembling work will be complicated. Moreover, because the commutator shaft is fixed to the upper surface of the rotary cylinder directly or with a coupling, maintenance becomes inconvenient.

SUMMARY OF THE INVENTION

An object of the present invention is to provide a rotary cylinder power feeding apparatus wherein the commutator assembling work can be made easy.

Another object of the present invention is to provide a rotary cylinder power feeding apparatus wherein the position of the commutator for the rotary cylinder shaft and brush can be determined by a simple formation.

Another object of the present invention is to provide a rotary cylinder power feeding apparatus wherein the commutator can be connected to such electronic circuit as of the preamplifier without increasing the number of the component parts and losing the reliability.

Another object of the present invention is to provide a rotary cylinder power feeding apparatus wherein, in case the power feeding apparatus is formed separately from the rotary cylinder, the rotary cylinder rotating operation will be transmitted to the power feeding apparatus so that the power may be securely fed.

Another object of the present invention is to provide a rotary cylinder power feeding apparatus wherein a countermeasure against noise is applied to the rotary power fed by the commutator and brush.

The rotary cylinder power feeding apparatus according to the first embodiment includes:

a rotary cylinder provided with a magnetic head and an electronic circuit to be connected to the magnetic head;

a columnar rotor rotating integrally with the rotary cylinder;

conductive members each comprising a plurality of conductors arranged in such a state as divided in a circumferential peripheral direction on an outer peripheral surface of this rotor and electrically connected to the above mentioned electronic circuit; and conductive brushes fitted to contact these conductive members and feeding a power to the above mentioned electronic circuit through the above mentioned conductive members.

According to the first embodiment, when the conductive member arranged on the outer peripheral surface of the columnar rotor rotating integrally with the rotary cylinder is separated into a plurality of parts, for example, three parts, in said conductive member assembling work, the above mentioned separated conductive member parts will be able to be assembled, for example, by being pasted to the above mentioned columnar rotor from the side without being fitted in so that the conductive member assembling work may be easy.

The rotary cylinder power feeding apparatus according to the second invention comprises:

a rotary cylinder provided with a magnetic head and an electronic circuit to be connected to this magnetic head;

a rotary driving member rotating integrally with this rotary cylinder;

a columnar rotor supported by a supporting member coaxially with the above mentioned rotary driving member, separately from the above mentioned rotary driving member and rotatably;

conductive members provided on the outer peripheral surface of the above mentioned rotor and electrically connected to the above mentioned electronic circuit;

conductive brushes provided on the above mentioned supporting member, contacting the above mentioned conductive members and feeding a power to the above mentioned electronic circuit; and a rotation transmitting means provided between the above mentioned rotary driving member and the above mentioned rotor and transmitting the rotation of the above mentioned rotary driving member to the above mentioned rotor.

According to the second embodiment, when the rotation transmitting member fitted between the columnar rotor forming the rotary shaft of the above mentioned electric conductive member and the rotary driving member and the rotary driving member rotating integrally with the rotary shaft of the rotary cylinder are engaged with each other, the rotary cylinder rotating operation will be able to be securely transmitted to the columnar rotor and the relative positions in the vertical direction of the above mentioned conductive member and conductive brush will be able to be well determined.

The rotary cylinder power feeding apparatus according to the third embodiment comprises:

a rotary cylinder provided with a magnetic head and an electronic circuit to be connected to said magnetic head and rotated and driven as rotatably provided for against (or opposite) a fixed cylinder fixed to a chassis;

a supporting member provided with two ends, removably fitted at one end to a fitting member provided in the above mentioned chassis and supporting at the other end a columnar rotor so as to rotate integrally with the above mentioned rotary cylinder;

conductive members provided on the outer peripheral surface of the above mentioned rotor and electrically connected with the above mentioned electronic circuit when the above mentioned supporting member is fitted to the above mentioned chassis;

conductive connecting terminals arranged at one end of the above mentioned supporting member and electrically connected with a power feeding terminal provided opposite the above mentioned chassis when the above mentioned supporting member is fitted to the above mentioned chassis; and conductive brushes arranged at the other end of the above mentioned supporting member, contacting the above mentioned conductive members as electrically connected with the above mentioned conductive connecting terminals and feeding the power to the above mentioned electronic circuit.

According to the third embodiment, as the rotor rotating integrally with the rotary cylinder is rotatably fitted to the supporting member, the conductive member is arranged on the outer peripheral surface of this rotor, the conductive connecting terminal connectable with the power generating part is arranged at one end of the supporting member and the conductive brush for feeding a voltage from the power generating part to the electronic circuit through the above mentioned conductive member is arranged at the other end of the supporting member, without using such means as the lead wires and soldering, by only fitting the supporting member to the chassis, the supply source voltage from the power generating part will be able to be fed to the electronic circuit within the rotary cylinder through the conductive brush and the conductive member connected with the conductive brush and the power feeding apparatus will be able to be very easily fitted to the rotary cylinder.

The rotary cylinder power feeding apparatus according to the fourth embodiment comprises:

a rotary cylinder provided with a magnetic head and an electronic circuit to be connected to the magnetic head;

a tape-like recording medium running as wound on this rotary cylinder and having information signals recorded or reproduced by the above mentioned magnetic head;

a columnar rotor rotating integrally with the above mentioned rotary cylinder;

conductive members comprising a plurality of conductors arranged as divided in a circumferential direction on an outer peripheral surface of the columnar rotor and electrically connected to the above mentioned electronic circuit;

connecting means electrically connecting the conductive members and the above mentioned electronic circuit with each other; and conductive brushes fitted to contact the above mentioned conductive member and feeding a power to the above mentioned electronic circuit through the above mentioned conductive member, and is characterized in that:

a center angle of one conductor of the plurality of conductors forming the above mentioned and divided in the circumferential direction conductive member is formed to be larger than a tape winding angle when the above mentioned tape-like recording medium is wound on the rotary cylinder;

the above mentioned connecting means is arranged near the above mentioned magnetic head; and, in a magnetic head rotating position in which the above mentioned magnetic head does not detect a signal from the above mentioned tape-like recording medium, the above mentioned plurality of conductors are arranged on the outer peripheral surface of the above mentioned columnar rotor so that a joint part between the plurality of conductors forming the above mentioned conductive member may contact the above mentioned conductive brush.

According to the fourth embodiment, as the center angle of one conductor of the plurality of conductors forming the above mentioned conductive member is formed to be larger than the tape winding angle on the rotary cylinder, such connecting means as the lead wires and connector are arranged near the magnetic head and, in a rotating position in which the magnetic head detects a signal from the tape-like recording medium, the above mentioned plurality of conductors are arranged on the outer peripheral surface of the above mentioned columnar rotor so that the joint part between the above mentioned plurality of conductors may not contact the above mentioned conductive brush, the electric noise generated when the joint part between the conductors contacts the conductive brush will not influence the recorded and reproduced signals of the magnetic head and the recording and reproducing quality in the recording and reproducing apparatus will be able to be improved.

The rotary cylinder power feeding apparatus according to the fifth embodiment comprises:

a rotary cylinder provided with two magnetic heads arranged as opposed to each other on a rotary peripheral surface of said rotary cylinder and an electronic circuit to be connected to said magnetic heads;

a tape-like recording medium running as wound on this rotary cylinder and having information signals recorded or reproduced alternately by the above mentioned two magnetic heads;

a columnar rotor rotating integrally with the above mentioned rotary cylinder;

conductive members comprising a plurality of conductors arranged as divided in a circumferential direction on an outer peripheral surface of this rotor and electrically connected to the above mentioned electronic circuit;

connecting means electrically connecting the above mentioned electronic circuit with this conductive member; and conductive brushes fitted to contact the above mentioned conductive members and feeding a power to the above mentioned electronic circuit through the above mentioned conductive member, and is characterized in that:

a center angle of one conductor of the plurality of conductors forming the above mentioned conductive member and divided in the circumferential direction is formed to be larger than a tape winding angle when the above mentioned tape-like recording medium is wound on the rotary cylinder;

the above mentioned connecting means is arranged near the first magnetic head of the above mentioned two magnetic heads; and in a first magnetic head rotating position in which the above mentioned first magnetic head does not detect a signal from the above mentioned tape-like recording medium, the above mentioned plurality of conductors are arranged on the outer peripheral surface of the above mentioned columnar rotor so that a joint part between the plurality of conductors forming the above mentioned conductive member may contact the above mentioned conductive brush.

According to the fifth embodiment, as the center angle of one conductor of the plurality of conductors forming the conductive member is formed to be larger than the tape winding angle on the rotary cylinder, such connecting means as lead wires and connectors are arranged near the first magnetic head of the two magnetic heads and, in a rotating position in which this first magnetic head detects a signal from the tape-like recording medium, the above mentioned plurality of conductors are arranged on the outer peripheral surface of the above mentioned columnar rotor so that the joint part between the above mentioned plurality of conductors may not contact the above mentioned conductive brush, therefore the electric noise generated when the joint part between the conductors contacts the conductive brush will not influence the recorded and reproduced signals of the magnetic head and the recording and reproducing quality in the recording and reproducing apparatus provided with two or more magnetic heads will be able to be improved. In this case, as the other magnetic head than the first magnetic head is in a position separate from the connecting means which is a noise generating source, when the other magnetic head detects a signal, even if an electric noise is generated, the electric noise will be harder to mix into the other magnetic head than the first magnetic head.

BRIEF DESCRIPTION OF THE DRAWINGS

FIG. 3 is a side view of a VTR main part showing the formation of the rotary cylinder power feeding apparatus.

FIG. 4 is a perspective view for explaining the formation of a commutator of the rotary cylinder power feeding apparatus.

FIG. 5 is a sectioned view of a VTR main part showing the formation of the rotary cylinder power feeding apparatus.

FIG. 6 (a) is a plan view showing a plate spring member having functions of transmitting the rotary cylinder rotating operation and holding the commutator positioning.

FIG. 6 (b) is a plan view showing a coupling to be engaged as opposed to a plate spring member shown in FIG. 6 (a).

FIG. 7 is a perspective view showing the formation of the rotary cylinder power feeding apparatus.

FIG. 8 is a sectioned view of a VTR main part fitted with the rotary cylinder power feeding apparatus.

FIGS. 10 to 15 show a fourth embodiment of the rotary cylinder power feeding apparatus according to the present invention.

FIG. 10 is a perspective view showing the formation of a commutator.

FIG. 11 is a plan view of the rotary cylinder power feeding apparatus using the commutator in FIG. 10.

FIG. 12 is a side view of FIG. 11.

FIG. 13 is a plan view showing a rotary cylinder power feeding apparatus in which electric noise will be generated in a commutator depending on the rotating position of the rotary cylinder.

FIG. 14 is a plan view showing a rotary cylinder power feeding apparatus in which electric noise will be generated in a commutator depending on the rotating position of the rotary cylinder.

FIG. 15 (a) to FIG. 15 (d) are phase relation diagrams of a head detected signal, synthesized signal and electric noise generating position.

FIG. 15 (a) is a diagram showing the detected signal of a head 5a.

FIG. 15 (b) is a diagram showing the detected signal of a head 5b.

FIG. 15 (c) is a diagram showing the detected signal of a synthesized signal.

FIG. 15 (d) is a diagram showing an electric noise.

DETAILED DESCRIPTION OF THE PREFERRED EMBODIMENTS

The preferred embodiments will now be explained with reference to the drawings.

Figure 1:
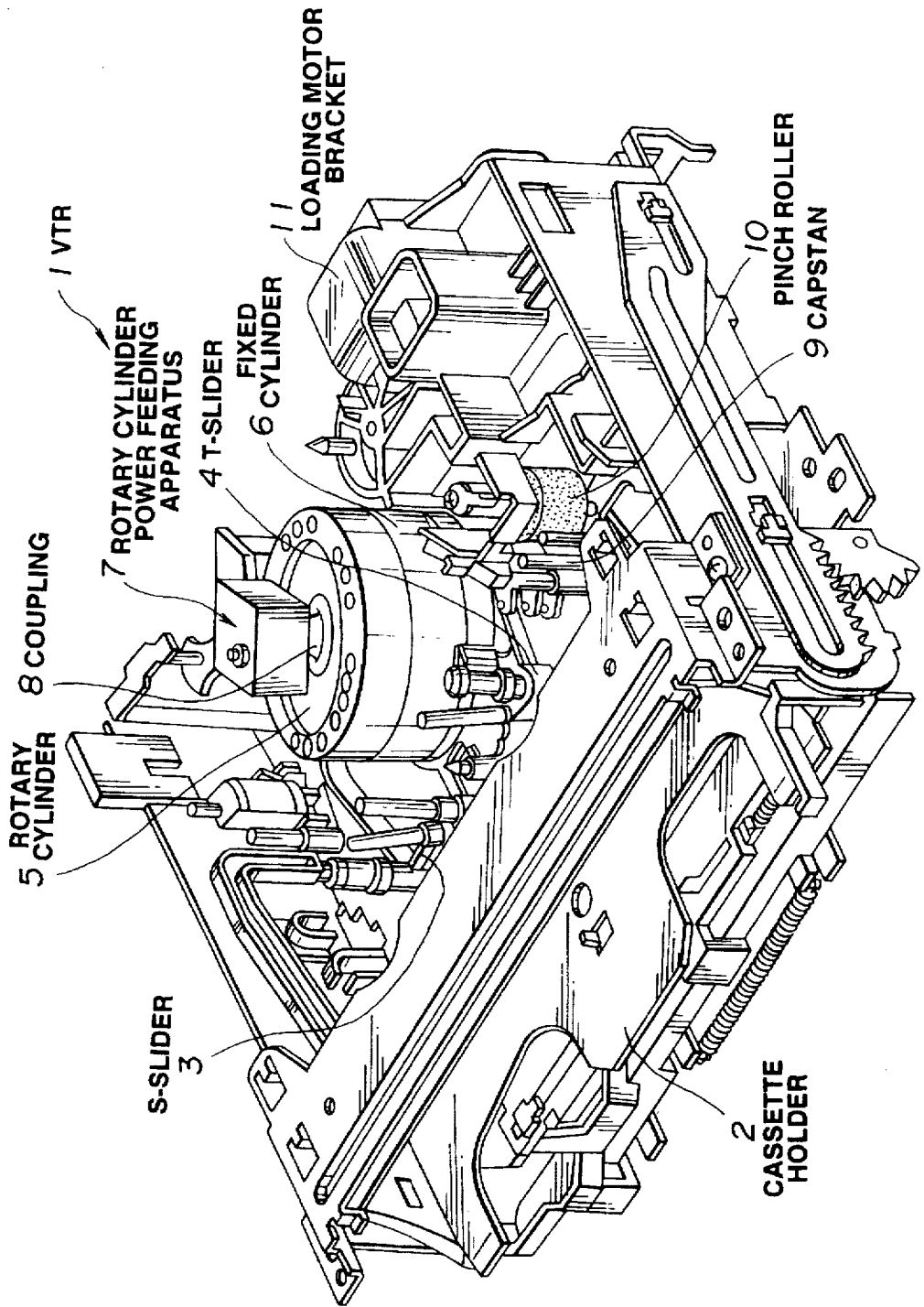
FIG. 1 is a perspective, partial cut away view showing the general formation of a VTR using a rotary cylinder power feeding apparatus according to the present invention.
Figure 2:
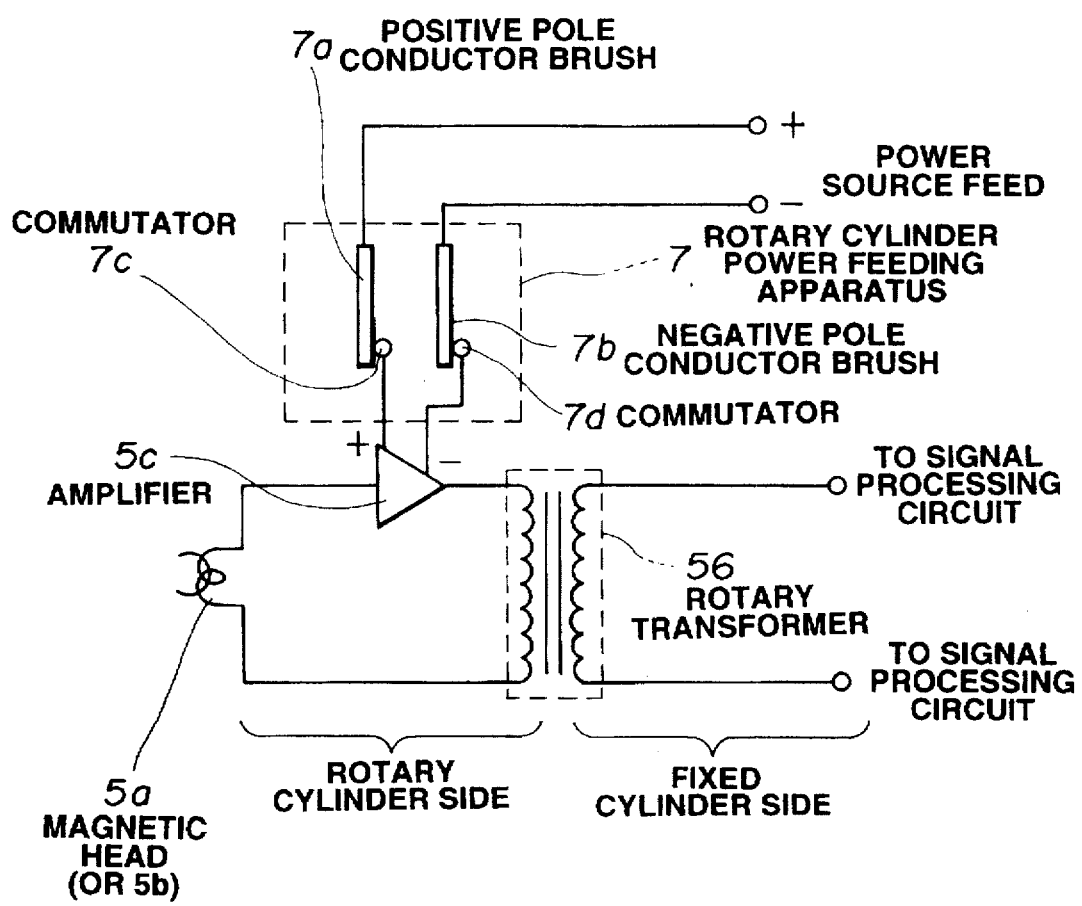
FIG. 2 is a block diagram showing the principle of the rotary cylinder power feeding apparatus shown in FIG. 1.
Figure 3:
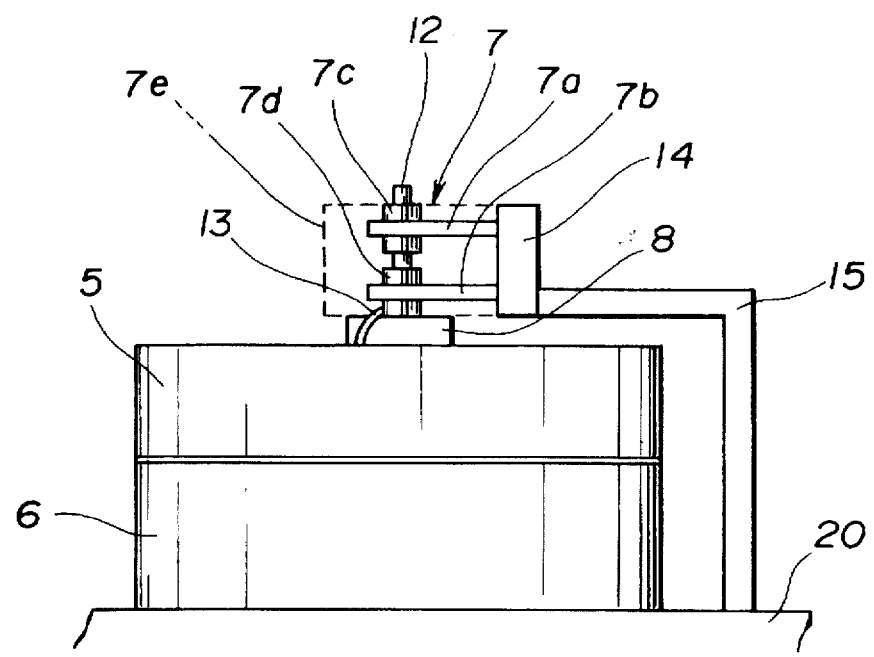
FIGS. 3 and 4 show the first embodiment of the rotary cylinder power feeding apparatus according to the present invention.
Figure 4:
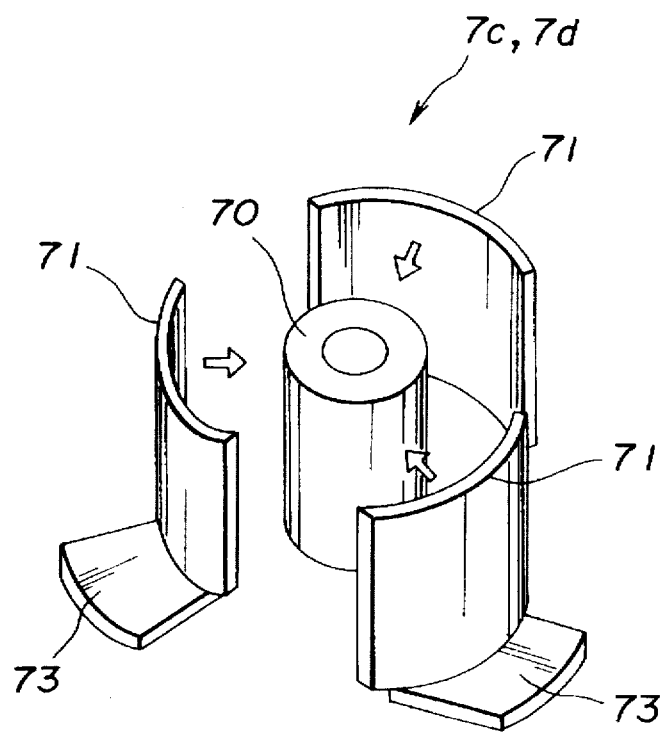

FIGS. 1 to 4 show the first embodiment of a rotary cylinder power feeding apparatus according to the present invention. FIG. 1 is a general formation view showing the formation of a VTR using a rotary cylinder power feeding apparatus. FIG. 2 is a block diagram showing the principle of the rotary cylinder power feeding apparatus shown in FIG. 1. FIG. 3 is a side view of a VTR main part showing the formation of a rotary cylinder power feeding apparatus according to the present invention. FIG. 4 is a perspective view showing the formation of a commutator.

As shown in FIG. 1, a VTR 1 is provided with a cassette holder 2 which carries in a cassette tape (not illustrated) and carries the cassette tape to a predetermined position as a preparing step for loading the tape. The cassette tape carried by this cassette holder 2 is set in a predetermined position within the VTR 1 and is then loaded by an S (supply reel side) slider 3 and T (take-up reel side) slider 4. As a result, the tape pulled out of the cassette tape will be wound at a predetermined angle on the outer peripheral surfaces of a rotary cylinder 5 and fixed cylinder 6.

Now, for example, in the case of reproduction, a video signal will be detected from the tape sliding on the outer peripheral surface of the rotary cylinder by a plurality of magnetic heads provided on the rotary cylinder 5, will be fed to such electronic circuit (not illustrated) as of a preamplifier arranged within the rotary cylinder 5 and will be amplified at a predetermined amplification rate. Therefore, at a better S/N ratio, the video signal will output from the electronic circuit preamplifier and will be fed to the fixed cylinder side through a rotary transformer. Then, the video signal will be processed by a signal processing circuit (not illustrated) provided on the main substrate of the body and will be able to be obtained as a video image and audio output.

In order to feed power from the body to the preamplifier electronic circuit, as shown in FIG. 1, a rotary cylinder power feeding apparatus 7 in this embodiment is fitted to the rotary cylinder 5 on the upper part and is pivoted with the shaft of the rotary cylinder 5 through a coupling.

For example, as shown in FIG. 2, the rotary cylinder power feeding apparatus 7 is an apparatus for feeding power from the body to the electronic circuit of a preamplifier 5c arranged, for example, within the rotary cylinder 5. The power feeding apparatus 7 is provided with conductive brushes 7a and 7b having positive and negative poles connected with the power source apparatus of the body. When these brushes 7a and 7b contact respectively commutators 7c and 7d as conductive members provided with positive and negative poles connected with a preamplifier 5c arranged within the rotary cylinder 5, the power will be fed to the preamplifier electronic circuit and, as a result, the electronic circuit will be driven. Thereby, the video signal detected from the sliding tape (not illustrated) by the magnetic head 5a (or 5b) arranged on the outer periphery of the rotary cylinder 5 will be amplified by the electronic circuit of the preamplifier 5c, will be transmitted to the fixed cylinder 6 side through a magnetically connected rotary transformer 56 and will be able to be fed to a signal processing circuit (not illustrated) provided in the main substrate.

Therefore, FIG. 3 shows an example which, to eliminate the problems in the conventional technique, the working of assembling commutators in the rotary cylinder power feeding apparatus has been improved.

As shown in FIG. 3, the rotary cylinder power feeding apparatus 7 in this embodiment is fixed by an arm 15 fixed to a main base 20 forming a chassis of the VTR 1. The arm 15 functions as a supporting member. On the other hand, within the rotary cylinder 5, for example, as described above, the electronic circuit of the preamplifier 5c is arranged and is connected to the commutators 7c and 7d of the rotary cylinder power feeding apparatus 7 through lead wires 13 connected with this electronic circuit. The commutators 7c and 7d corresponding respectively to these positive and negative poles rotate together with the rotary cylinder 5 but, when a brush supporting member 14 holding the brushes 7a and 7b of the rotary cylinder power feeding apparatus 7 is fixed in a predetermined position by the arm 15, the brushes 7a and 7b will be able to contact the rotating commutators 7c and 7d under a predetermined contact pressure. Therefore, contact friction will not negatively influence the sliding commutators 7c and 7d and the conducting state will be able to be always securely maintained. Thereby, the power from the body will be able to be fed to the electronic circuit of the preamplifier 5c arranged within the rotary cylinder 5.

The rotary cylinder power feeding apparatus 7 in this embodiment is preferably provided with a cabinet part 7e (which shall be mentioned as a shield cover hereinafter) shielding the rotary cylinder power feeding apparatus 7. In the case of FIG. 3, this shield cover is removed.

Therefore, the above mentioned commutator 7c or 7d of the rotary cylinder power feeding apparatus 7 in this embodiment is characterized by being formed, as shown in FIG. 4, of a commutator core 70 as a columnar rotor provided coaxially with the rotary cylinder 5 and fitted to a fixed shaft 12, a plurality of, or, for example, three metal pieces 71 as conductive members to be fitted to the outer periphery of this commutator 70, connecting terminals 73 to be connected to these metal pieces 71 and a disc member (washer) not illustrated to press and fix in the above mentioned commutator core 70 the above mentioned plurality of metal pieces 71 as fitted and exposing the connecting terminals 73.

The above mentioned metal piece 71 can be easily made by pressing, for example, one metal plate and, at the same time, in case the above mentioned shaft 12 is fixed through a coupling 8 on the upper surface of the rotary cylinder 5, the commutator core 70 will be first fitted to the above mentioned shaft 12, then the divided metal pieces will be jointed to the outer peripheral surface of the above mentioned commutator core 70 from the horizontal direction and therefore the fitting work will be easy.

Therefore, according to such formation, when the outer peripheral surface member as a conductive member forming the above mentioned commutators 7c and 7d is formed, for example, to be three metal pieces, for example, if the commutator core 70 is fitted in advance to the shaft 12 of the rotary cylinder power feeding apparatus, in the following assembling work, the above mentioned metal pieces 71 will be able to be respectively bonded, the commutator assembling work will be easy and the productivity will be able to be clearly expected to improve. The metal pieces 71 preferably are electrically connected with each other and are be connected with the electronic circuit through common lead wires 13.

Also, as described above, the metal piece 71 can be easily formed, for example, by pressing a flat plate. Thus, no special material member is required. Cheap material may be used, the surface may be specially worked with a precious metal and the electric connecting part material may be extensively utilized. As a result, the reliability will be able to be improved.

In this embodiment a rotary cylinder power feeding apparatus 7 is formed with the shield cover for shielding it. However, a conventional rotary cylinder power feeding apparatus without a shield cover may also be formed.

Figure 5:
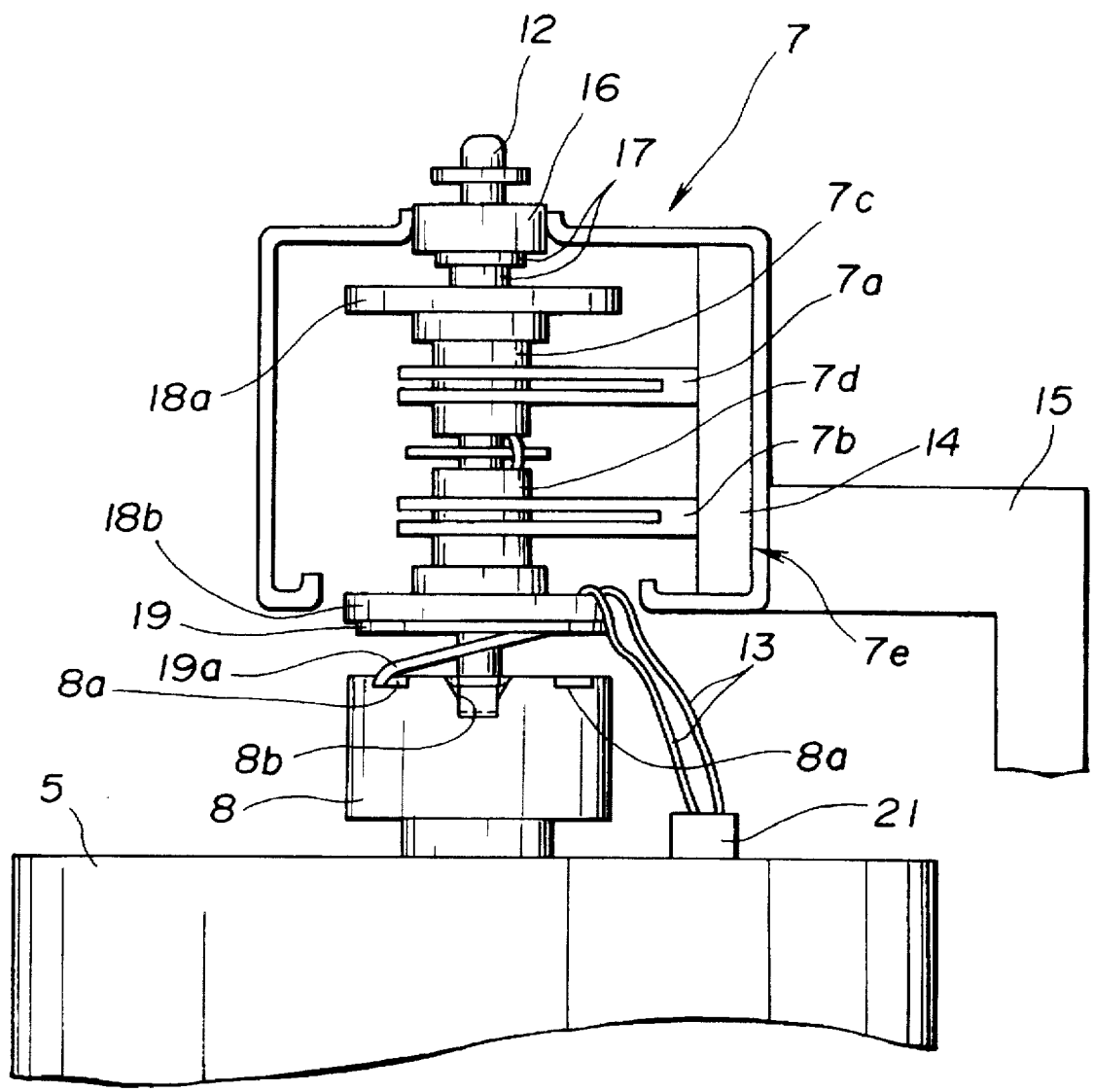
FIGS. 5 and 6 show the second embodiment of the rotary cylinder power feeding apparatus according to the present invention.
Figure 6A:
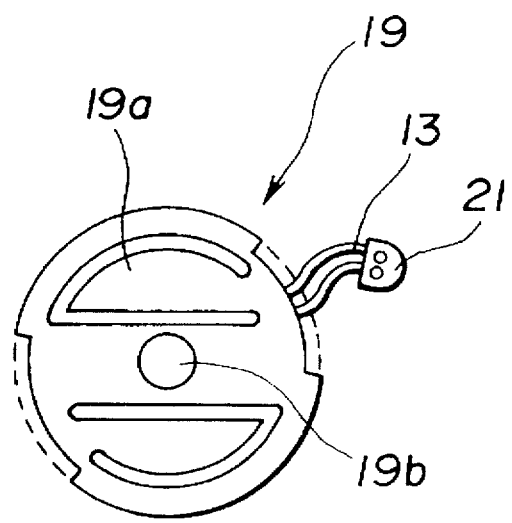
Figure 6B:
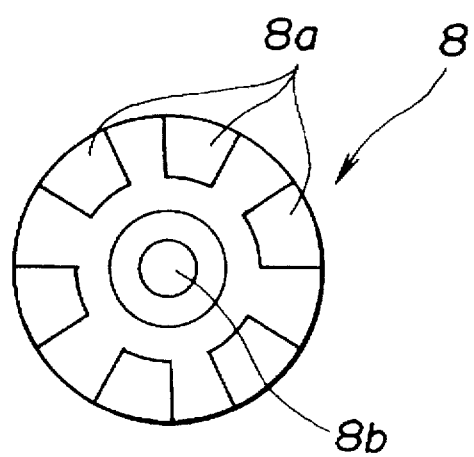

FIGS. 5 and 6 show the second embodiment of a rotary cylinder power feeding apparatus according to the present invention. FIG. 5 is a formation view of a VTR main part showing the formation of a rotary cylinder power feeding apparatus. FIG. 6 (a) is a lower surface view of a plate spring member engaged with a coupling fixed to a rotary cylinder and having functions of transmitting the rotary cylinder rotating operation and holding the positioning of a commutator. FIG. 6 (b) is an upper surface view of a coupling engaged with the above mentioned plate spring member. The lower surface of the plate spring member shown in FIG. 6 (a) and the upper surface of the coupling shown in FIG. 6 (b) are to be opposed to each other. Also, in these drawings, the same components as in the first embodiment are indicated by the same reference numerals.

The rotary cylinder power feeding apparatus 7 in this embodiment includes, for example, as shown in FIG. 5, commutators 7c and 7d formed of positive and negative conductive devices, brushes 7a and 7b contacting the positive and negative poles respectively of these commutators 7c and 7d and a holder 14 providing and supporting these brushes 7a and 7b with a predetermined width. The rotary cylinder power feeding apparatus 7 is formed as one package by shielding all the outside surface of this formed rotary cylinder power feeding apparatus 7 with the shield cover 7e and, even when the rotary cylinder power feeding apparatus 7 is formed as one package, the rotary cylinder 5 rotating operation will be securely transmitted through the coupling 8 as a rotating driving member, and the respective commutators 7c and 7d will always be positioned in a predetermined position.

As shown in FIG. 5, for example, the rotary cylinder power feeding apparatus 7 is provided with a shaft 12 coaxial with the rotary cylinder 5. Shaft 12 is fitted in the upper part through a metal member 16 and is made slidable vertically with respect to the metal member 16. On the lower surface of the metal member 16, a washer 17 is provided and loosely fitted to the shaft 12. The respective commutators 7c and 7d of the positive and negative poles are bonded and fixed respectively to disc members 18a and 18b and are rotatably fitted to the above mentioned shaft 12. In this embodiment, the disc member 18a is arranged to be below the washer 17 and the disc member 18b is arranged on the rotary cylinder side.

The commutators 7c and 7d are positioned and contacted to correspond respectively to the positive and negative poles of the brushes 7a and 7b. The brushes 7a and 7b are supported by a holder 14 and are packaged by a shield cover 7e enclosing the holder 14, the metal member 16 fitted to the upper part of the shaft 12 and the commutators 7c and 7d fitted to the shaft 12 and brushes 7a and 7b. The holder 14 is fixed to the main base through an arm 15.

Here, as shown in FIG. 6 (a), an engaging member 19 forming at least two plate springs 19a and 19b as resilient pieces of a metal plate on the lower surface of the disc member 18b to which the negative pole commutator 7d is fitted. The engaging member 19 forms a rotation transmitting means together with a later described groove 8a. These plate springs 19a and 19b are formed to project toward the rotary cylinder 5 side and are energized in the vertical direction for the engaging member 19. In the outer peripheral end part of this engaging member 19, the lead wires 13 connected with the commutators 7c and 7d and a connector 21 at the tips of these lead wires 13 are led out through the disc member 18b.

On the other hand, on the rotary cylinder 5 side, a coupling 8 is provided on the upper surface of the rotary cylinder 5 and is fitted to the shaft of the rotary cylinder 5 to rotate together with the rotary cylinder 5. On the upper surface of the coupling 8, for example, as shown in FIG. 6 (b), a plurality of grooves 8a engaging with the two plate springs 19a and 19b of the engaging member 19 are formed to form a rotation transmitting means together with the engaging member 19. Near the center of the upper surface, an axial hole 8b is formed with a predetermined depth and is tapered in the upper part. This hole receives the lower end of shaft 12 of the rotary cylinder power feeding apparatus 7 when the rotary cylinder power feeding apparatus 7 is fitted by the arm 15. The taper is provided to facilitate assembly.

The lead wires 13 projecting out of the disc member 18b are fitted at the tips to a connector 21 and will be connected when the above mentioned connector 21 is inserted into a connector inserting hole (not illustrated) connected with the electronic circuit of the preamplifier arranged within the rotary cylinder 5.

Now, the operation of the thus formed rotary cylinder power feeding apparatus shall be explained in detail with reference to FIG. 5.

The rotary cylinder power feeding apparatus 7 is lowered from the upward direction of the coupling 8 borne on the upper surface of the rotary cylinder 5, is arranged so that the shaft 12 of the rotary cylinder power feeding apparatus 7 and the bearing hole 8b of the coupling 8 may join with each other and is fixed and fitted to the main base by the arm 15.

In this case, in the relative positions of the brushes 7a and 7b and the commutators 7c and 7d of the rotary cylinder power feeding apparatus 7, by the vertically upward energizing force by the plate springs 19a and 19b of the engaging member 19 bonded to the lower surface of the disc member 18b, the above mentioned disc member 18b will be always pushed up, therefore the washer 17 loosely fitted to the shaft 12 will join with the metal member 16 fixed to the shield cover 7e and thereby a fixed height will be able to be maintained. Thereby, the brushes 7a and 7b of the commutators 7c and 7d within the rotary cylinder power feeding apparatus 7 will be always stably positioned, that is to say, a positive contact state will be able to be held and therefore power will be able to be effectively fed.

Therefore, when for example during reproduction, the rotary cylinder 5 will rotate and cause the plate springs 19a and 19b projecting out of the engaging member 19 on the rotary cylinder power feeding apparatus 7 side to engage with the plurality of grooves 8a of the coupling 8 fitted to the shaft of the rotary cylinder 5. Thus, the rotary cylinder 5 rotational motion will be transmitted to the shaft 12 of the commutators 7c and 7d through the grooves 8a of the coupling 8 and the plate springs 19a and 19b linked with these grooves 8a, so that the torque will be transmitted to the rotary cylinder power feeding apparatus 7.

Thereby, when the rotary cylinder power feeding apparatus 7 is arranged to engage with the couplings 8 of the rotary cylinder 5 and is only fitted to the arm 15 fixed to the main base, the rotary cylinder 5 rotational operation will be easily transmitted, the commutators 7c and 7d will be easily positioned with respect to the brushes 7a and 7b and further the power from the body will be securely fed to the electronic circuit of the preamplifier arranged within the rotary cylinder 5.

Therefore, in this embodiment, when the plate springs 19a and 19b are used as rotating power transmitting means, without using the member for positioning the relative positions of the commutators 7c and 7d and the brushes 7a and 7b and the member for transmitting the rotary cylinder 5 rotating power, the relative positions of the commutators 7c and 7d and the brushes 7a and 7b will be positioned and power will be able to be easily transmitted to the electronic circuit within the rotary cylinder. Also, when the rotary cylinder power feeding apparatus 7 is packaged, not only the assembling work will become easy but also the productivity will be able to be improved.

This embodiment the engaging member 19 is provided in the disc member 18b and the plurality of grooves 8a are provided in the coupling 8. However, the plurality of grooves may be formed in the disc member 18b and the engaging member 19 may be provided in the coupling 8.

Also, the plurality of grooves engaging with the plate springs of the above mentioned coupling 8 may be radially provided so as to be easily meshed and engaged, for example, in assembling.

Figure 7:
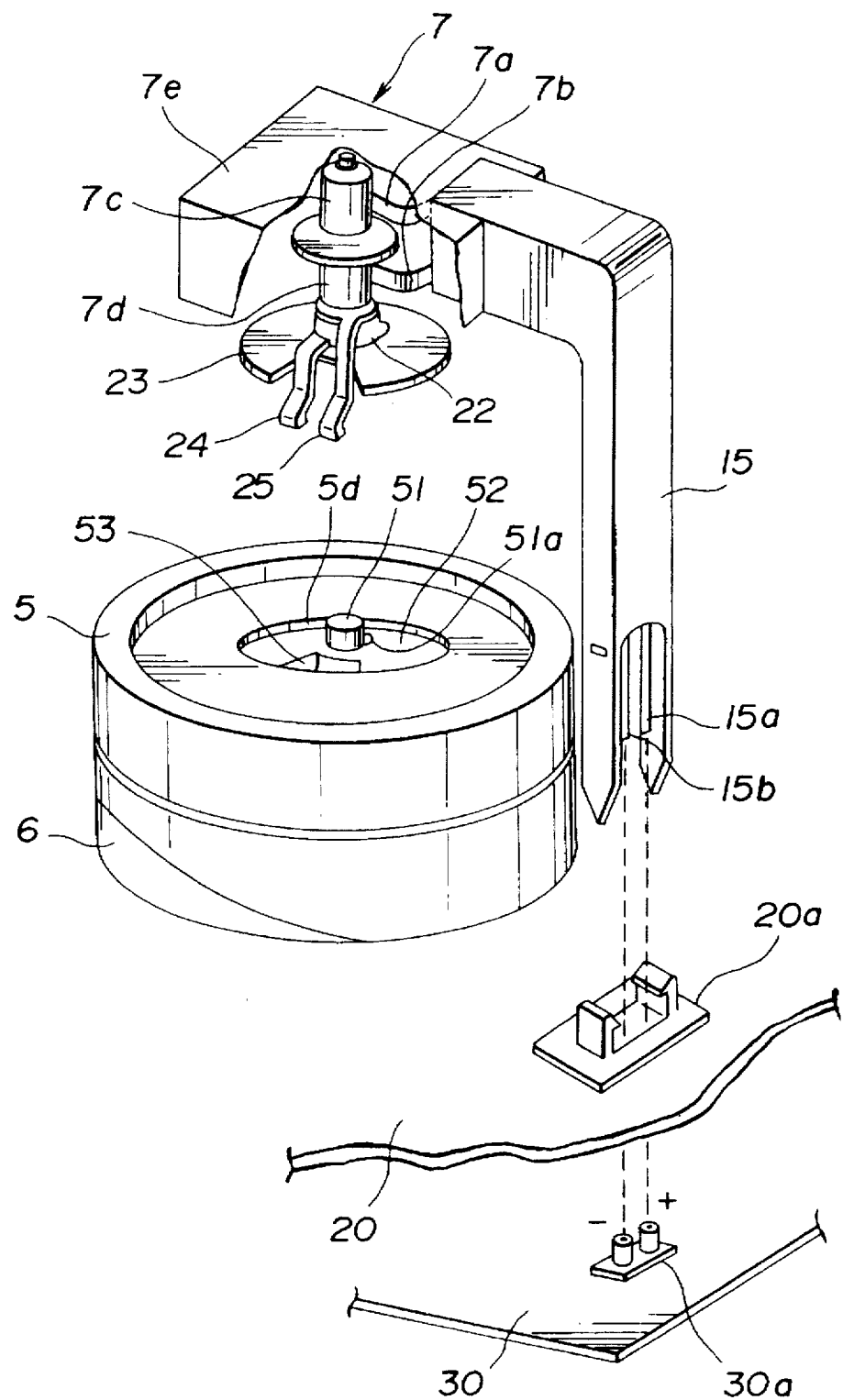
FIGS. 7 and 8 show the third embodiment of the rotary cylinder power feeding apparatus according to the present invention.

FIG. 7 shows an improved example of directly connecting the rotary cylinder power feeding apparatus 7 and the electronic circuit of the preamplifier within the rotary cylinder 5 with each other without using the lead wires and connectors.

Figure 8:
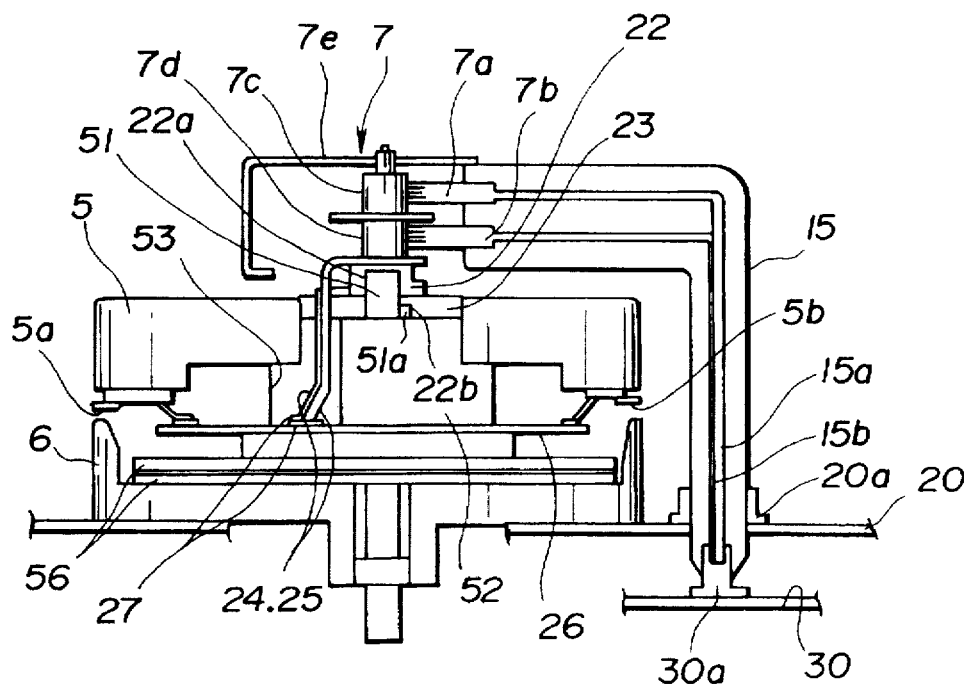
Figure 9:
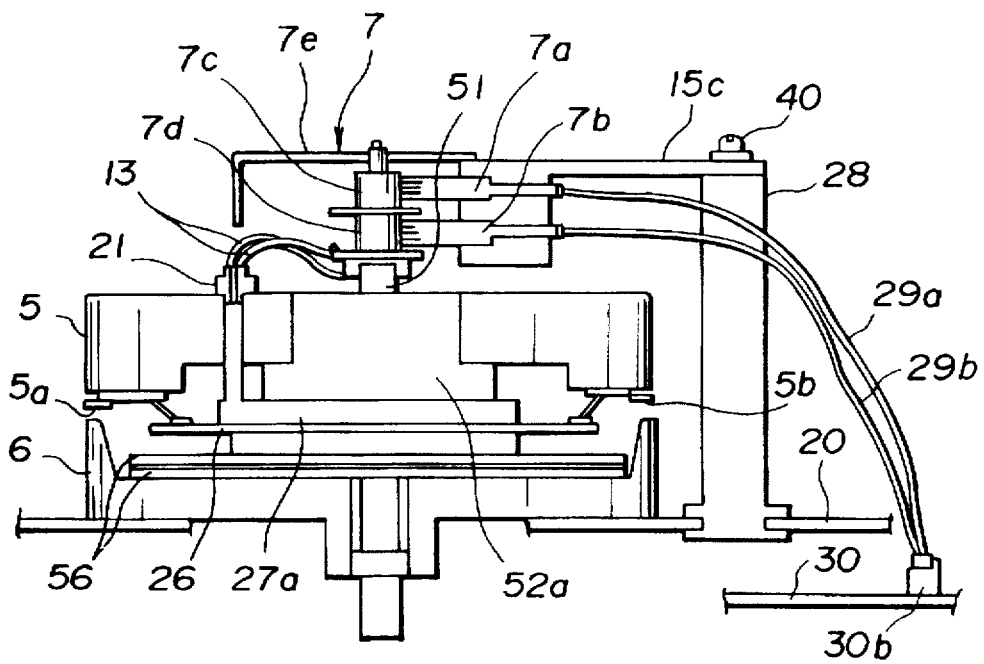
FIG. 9 is a comparative sectioned view showing an example of the rotary cylinder power feeding apparatus provided with a lead wire connecting system and for explaining the rotary cylinder power feeding apparatus shown in FIG. 8.

FIGS. 7 and 8 show the third embodiment of a rotary cylinder power feeding apparatus according to the present invention. FIG. 7 is a perspective view showing the formation of the rotary cylinder power feeding apparatus. FIG. 8 is a sectioned view of a VTR main part fitted with the rotary cylinder power feeding apparatus. FIG. 9 is a comparative sectioned view for explaining the rotary cylindrical power feeding apparatus shown in FIG. 8 and showing an example of the rotary cylinder power feeding apparatus provided with a lead wire connecting system.

In FIGS. 7 to 9, components the same as components in the other embodiments are indicated with similar reference numerals. Therefore, a duplicative explanation will not be given and only the different parts will be explained.

As shown in FIG. 9, the rotary cylinder power feeding apparatus 7 is usually fixed by means of screws 40 to an outsert molded stay 28 fixed to the main base 20 through an arm 15c. In order to feed power to the electronic circuit (not illustrated) of the preamplifier arranged within the rotary cylinder 5 through the rotary cylinder power feeding apparatus 7 from the power source apparatus (not illustrated) arranged on the body or so-called main substrate 30, it is necessary for the positive and negative pole lead wires 29a and 29b, connected respectively with the brushes 7a and 7b of the rotary cylinder power feeding apparatus 7, to be connected with the main substrate 30 side by means of the main substrate connector 30b. The lead wires 13 connected with the commutators 7c and 7d of the rotary cylinder power feeding apparatus 7 should also be connected with the preamplifier substrate 26 side within the rotary cylinder 5 by means of the connector 21.

However, in such connecting method, by using the lead wires 13, 29a and 29b and connectors 21 and 30b, there are at least two connected parts, for example, the connectors. Therefore, assembly becomes complicated and, when the rotary cylinder 5 rotates, as it is connected by the lead wires, a problem can arise in that the lead wires can contact, can become entangled with the rotary cylinder or can be broken.

Therefore, to eliminate these problems, this embodiment employs components which can be connected without using lead wires, thus simplifying assembly. An example of one such rotary cylinder power feeding apparatus is shown in FIG. 7.

In the drawing, in order to make it unnecessary to use two lead wire connections as described above, the connective structure between the rotary cylinder power feeding apparatus 7 and the preamplifier substrate 26 (See FIG. 8) within the rotary cylinder 5 is improved. Therefore, first, the connecting structure to the main substrate 30 shall be explained.

The arm 15 fixing the rotary cylinder power feeding apparatus 7 in a predetermined position is formed to be L-shaped and is extended at the lower end to be of a predetermined length so as to be engaged with a main substrate connector 30a arranged on the main substrate 30. A conductive member (not illustrated) is laid within the arm 15 connected from the brushes 7a and 7b of the above mentioned rotary cylinder power feeding apparatus 7. The positive pole conductive connecting terminal 15a and the negative pole conductive connecting terminal 15b corresponding respectively to the brushes 7a and 7b are fitted to the base end of this conductive member, that is, to the base end of the arm 15.

A through hole is provided in the main base 20 to receive arm 15 to engage at the base end with the main substrate connector 30a as a power feeding terminal of the main substrate 30. An outsert molded guide 20a as an arm fitting member for guiding and holding the arm 15 in a predetermined position is fitted to this through hole.

The structure connecting to the preamplifier substrate 26 (See FIG. 8) within the rotary cylinder 5 is provided on the lower surface of the negative pole commutator 7d of the rotary cylinder power feeding apparatus 7 with a connecting terminal 25 to be connected with this commutator 7d and is fitted with a shaft cap 22 which can be fitted and pivoted to the rotary shaft 51 of the rotary cylinder 5. This shaft cap 22 is provided at the lower end with a positive pole connecting terminal 24 to be connected with the commutator 7c. These connecting terminals 24 and 25 are extended by a predetermined length, for example, in the downward direction and are inserted through a flange cut hole 53 provided in the rotary cylinder 5 through a cut in plate 23 secured to the lower surface of the shaft cap 22. The plate 23 is designed to have a diameter which enables it to enter a hole 5d formed in the upper part of the rotary cylinder 5. As shown in FIG. 8, a concave hole 22a to be fitted and pivoted to the rotary shaft 51 of the rotary cylinder 5 is formed at the lower end of the shaft cap 22 and in the plate 23, a locking hole 22b is formed and connected to the above mentioned concave hole 22a and in order to positively lock the rotation of the rotary cylinder 5. That is to say, when the shaft cap 22 is fitted to the rotary shaft 51 of the rotary cylinder 5, the locking part 51a provided near the rotary shaft 51 of the rotary cylinder 5, that is, near the rotary shaft 51 on the cylinder flange 52, will be fitted in the locking hole 22b and, when the rotary cylinder 5 rotates, the rotary shaft 51 and, plate 23 and shaft cap 22 will be able to be locked.

As shown in FIG. 8, when the plate 23 secured to the lower end of the above mentioned rotary cylinder power feeding apparatus 7 is inserted into the hole 5d of the rotary cylinder 5 and is mounted on the upper surface of the cylinder flange 52, the plate 23 and shaft cap 22 will be inserted and fixed in the rotary shaft 51. When plate 23 is fitted on the upper surface of the cylinder flange 52, the outer peripheral surface of the plate 23 and the inner peripheral surface of the rotary cylinder 5 will be in close contact with each other. In this case, the thrust will be received by the bottom surface of the rotary cylinder 5 and the upper surface of the cylinder flange 52 and the radial force will be received, as described above, by the outer peripheral surface of the plate 23 and the inner peripheral surface of the rotary cylinder 5. Therefore, such fitting members as, for example, fitting screws for fixing the plate 23 will be able to be made unnecessary.

On the preamplifier substrate 26 fitted within the rotary cylinder 5, a preamplifier land 27 in direct contact with the connecting terminals 24 and 25 is provided in a predetermined position. When the rotary cylinder power feeding apparatus 7 is fitted, the connecting terminals 24 and 25 made integral with the rotary cylinder power feeding apparatus 7 will contact the preamplifier land 27 and will be able to be electrically connected. The preamplifier land 27 is connected with the electronic circuit of the preamplifier (not illustrated) by a printed wiring on the preamplifier substrate 26.

The method of fitting the rotary cylinder power feeding apparatus will now be explained in detail with reference to FIGS. 7 and 8.

First, as shown in FIG. 7, the arm 15 of the rotary cylinder power feeding apparatus 7 is inserted along the outsert guide 20a provided on the main base 20 and the positive and negative pole connecting terminals 15a and 15b at the tip of the above mentioned arm 15 are connected respectively to the main substrate connector 30a provided on the main substrate 30.

Simultaneously with this connection, connection is made to the rotary cylinder 5 which is a main part of the rotary cylinder power feeding apparatus 7. In this case, the positive and negative pole connecting terminals 24 and 25 projecting out of the end of the rotary cylinder power feeding apparatus 7 are inserted first from the diagonal direction into the cylinder cut hole 53 provided in the cylinder flange 52 within the rotary cylinder 5, are lowered toward the preamplifier substrate 26 fitted within the rotary cylinder 5 and are connected in contact with the preamplifier land 27 provided on the preamplifier substrate 26, as shown in FIG. 8. Also, simultaneously, the plate 23 and shaft cap 22 of the rotary cylinder power feeding apparatus 7 are fitted to the rotary shaft 51 of the rotary cylinder 5 and the plate 23 is fixed on the upper surface of the cylinder flange 52 to complete assembly of the rotary cylinder power feeding apparatus.

When the connecting terminals 24 and 25 are connected, the plate 23 of the rotary cylinder power feeding apparatus 7 will be in lose contact with the cylinder flange 52 of the rotary cylinder 5, and, when the plate and the shaft cap 22 are fitted to the rotary shaft 51 of the rotary cylinder 5, a predetermined contact pressure will be given and the contact will be able to be positively held.

Thereby, the power from the body will be fed, as shown in FIG. 8, to the main substrate connector 30a through the main substrate 30 from the power source apparatus (not illustrated) provided, for example, on the main substrate 30. Power is then fed to the brushes 7a and 7b of the rotary cylinder power feeding apparatus 7 through the conductive member (not illustrated) within the arm 15 from the connecting terminals 15a and 15b of the arm 15 connected with this main substrate connector 30a. Then power is fed to the connecting terminals 24 and 25 extended into the rotary cylinder 5 through the commutators 7c and 7d contacting these brushes 7a and 7b while rotating and will be able to be fed to the electronic circuit of the preamplifier through the printed wiring (not illustrated) on the preamplifier substrate 26 from the preamplifier land 27 connected with the connecting terminals 24 and 25.

When the electronic circuit of the preamplifier is driven by the power fed by the above mentioned rotary cylinder power feeding apparatus, at the time of the reproduction, the video signals detected from the magnetic heads 5a and 5b will be amplified and will be fed to the fixed cylinder 6 side, that is, to the signal processing circuit (not illustrated) provided on the main base 30 through the magnetically connected rotary transformer 56.

Therefore, according to this embodiment, when power from the body is to be fed, for example, to the electronic circuit of the preamplifier within the rotating rotary cylinder, the main base substrate provided with the power source apparatus will be able to be connected to the preamplifier substrate on which the electronic circuit of the preamplifier within the rotary cylinder is arranged without using lead wires so that the rotary cylinder power feeding apparatus assembling work may be simplified. Because no lead wire is used in the connecting structure, problems with contacts between the lead wires entanglements with the rotary cylinder or breakage can be prevented.

Further, because the brushes, commutators, shaft cap, plate and connecting terminals are integrated to form the rotary cylinder power feeding apparatus, assembly is easy and the number of the parts can be reduced and therefore it is evident that the cost can be also reduced.

The rotary cylinder power feeding apparatus to which a countermeasure against noise is applied shall be explained in the following.

Figure 10:
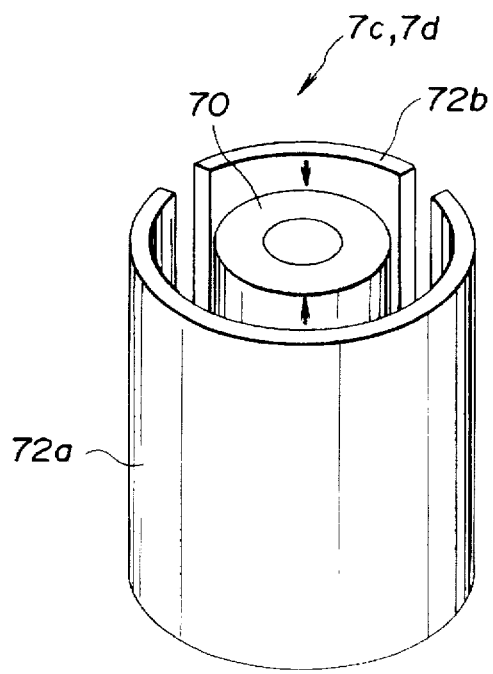
Figure 10:
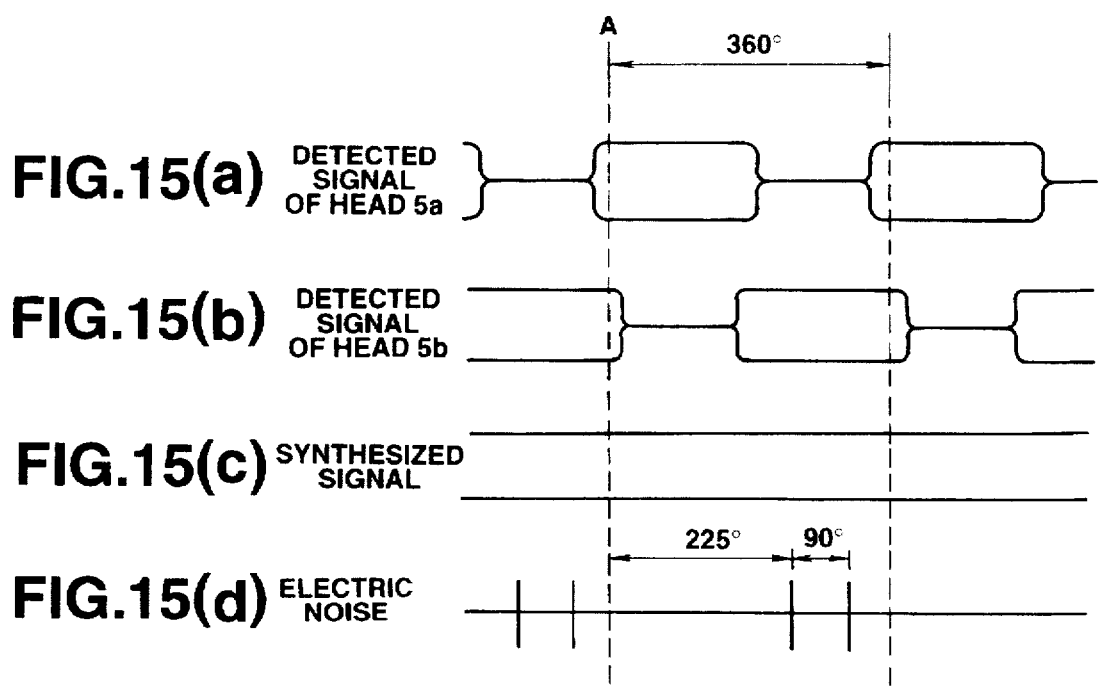
Figure 11:
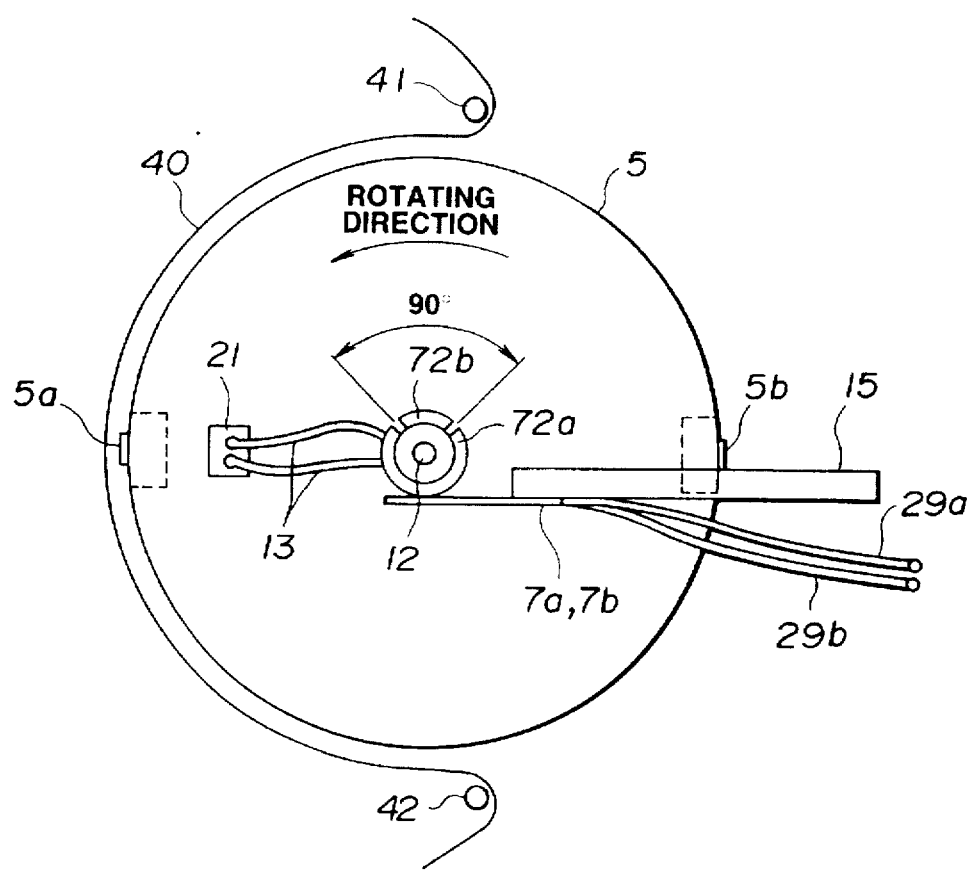
Figure 12:
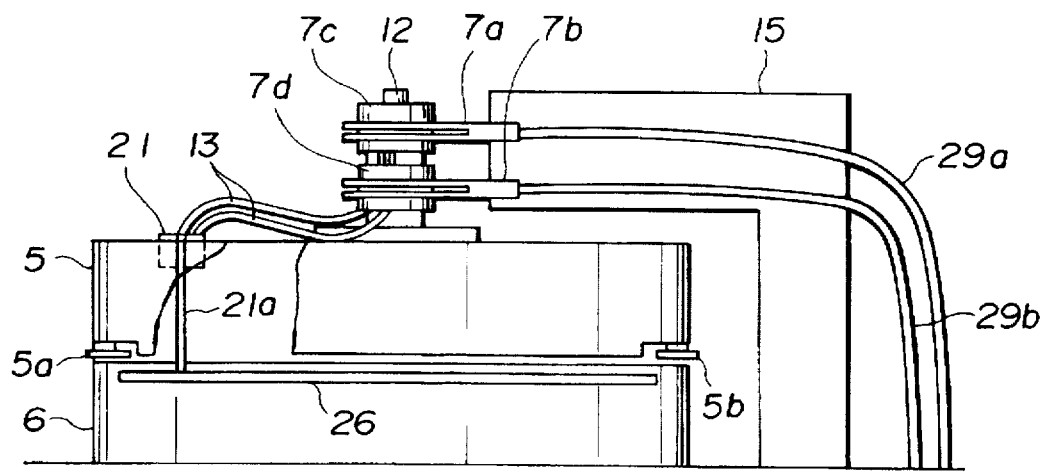

FIGS. 10 to 15 illustrate the fourth embodiment of a rotary cylinder power feeding apparatus according to the present invention. FIG. 10 is a perspective view showing the formation of a commutator. FIG. 11 is a plan of a rotary cylinder power feeding apparatus using the commutator. FIG. 12 is a side view of FIG. 11.

The commutator shown in FIG. 10 comprises two conductors 72a and 72b but, as opposed to FIG. 4, the connecting terminals at the lower ends of the conductors are omitted. These two conductors 72a and 72b are obtained by dividing a cylindrical form into two parts. When assembled, these two conductors will be pasted on the outer peripheral surface of a commutator core 70 to be fitted on a rotary shaft 12. At this time, between the conductors 72a and 72b pasted around the commutator core 70, as shown in FIG. 11, two slits will be formed as joint parts. The center angle of the conductor 72a of the two conductors 72a and 72b arcuate in the cross-section is set to be an angle larger than the tape 40 winding angle (about 190 degrees) on the rotary cylinder 5. Here, the center angle of the conductor 72a is made about 270 degrees and the center angle of the conductor 72b is made about 90 degrees. The magnetic tape 40 is used as a tape-like, recording medium to record and reproduce an information signal, such as a video signal.

As shown in FIG. 11, the magnetic tape 40 is wound on the rotary peripheral surface of the rotary cylinder 5 by using loading posts 41 and 42. Usually, the tape 40 is wound in a little excess of 180 degrees around the rotary cylinder 5. The angle connecting the two loading posts 41 and 42 and the center of the rotary shaft 12 is about 5 degrees larger on the respective loading post sides than the line of 180 degrees to be about 190 degrees. As shown in FIG. 12, the conductive brushes 7a and 7b are fixed to the supporting arm 15 and the commutators 7c and 7d fitted to the rotary shaft 12 rotate together with the rotary cylinder 5 and slide with the brushes 7a and 7b. Power is fed to the brushes 7a and 7b through the lead wires 29a and 29b from the power source apparatus arranged on the main substrate (not illustrated). The commutators 7c and 7d are connected with a relay lead 21a through the lead wires 13 and connector 21. The relay lead 21a is connected with the electronic circuit of the preamplifier of the preamplifier substrate 26. Therefore, the power source apparatus (not illustrated) is electrically connected to the electronic circuit within the rotary cylinder 5 through the brushes 7a and 7b.

Figure 13:
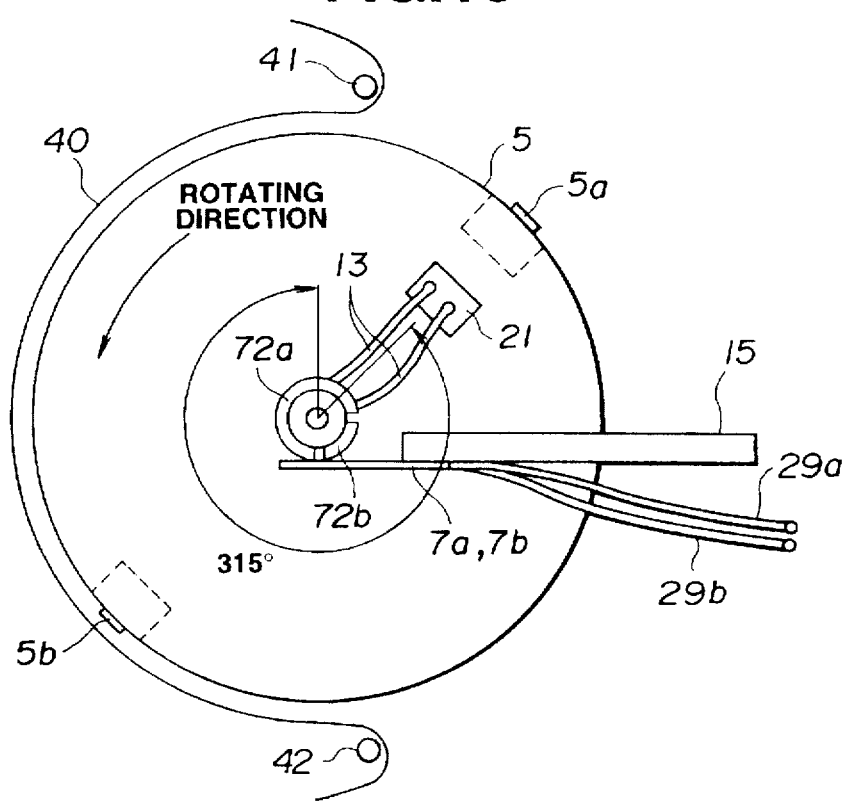
Figure 14:
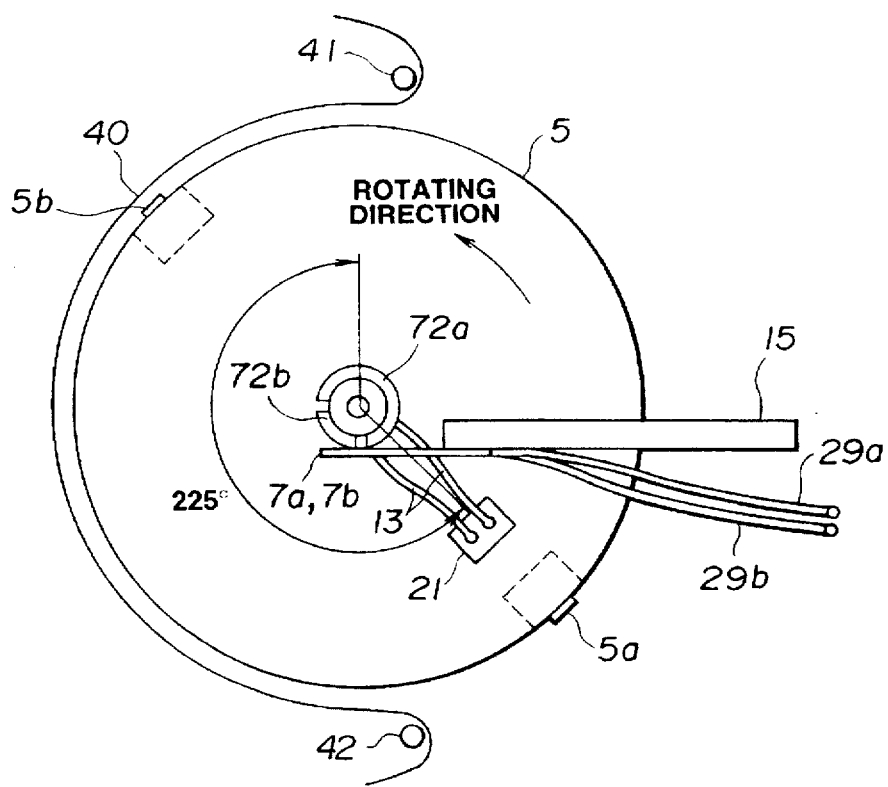

In this formation, because the commutators 7c and 7d comprise respectively two conductors 72a and 72b, slits as joint parts will be made between the conductors 72a and 72b and between the conductors 72b and 72a. Accordingly, when these slit parts contact the brushes 7a and 7b, the contact resistance will become unstable and an electric noise will be generated. The generated electric noise will be transmitted to an electronic circuit noise removing device mounted on the preamplifier substrate 26 through the lead wires 13, connector 21 and relay lead 21a, will generate electromagnetic waves around the noise removing device and will plunge into the nearby magnetic head 5a. However, in this embodiment, as shown in FIGS. 13 and 14, when the slit part of the commutator contacts the brushes 7a and 7b (when an electric noise is generated), the head 5a likely to be influenced by the electric noise will not contact the tape 40 having recorded an information signal and will not detect the signal and therefore the head 5a will not be influenced by the electric noise. At this time, the head 5b hard to be influenced by the electric noise and on the side opposed by 180 degrees to the head 5a will be in contact with the tape 40 to detect the signal. As a result, no noise will be mixed in the signal obtained by synthesizing the respective signals detected by the heads 5a and 5b.

FIGS. 13 and 14 are plan views showing the rotary cylinder power feeding apparatus when the brushes 7a and 7b contact the slit part of the commutator and an electric noise is generated depending on the rotating position of the rotary cylinder 5. FIG. 13 shows that the rotary cylinder 5 rotates and the slit part between the conductors 72a and 72b forming the commutator is in contact with the conductive brushes 7a and 7b. At this time, the head 5a will not be contact with the tape 40 and will not detect the signal but the other head 5b hard to be influenced by the electric noise will be in contact with the head 5b and will detect the signal. Therefore, the electric noise generated at this time will not influence the signal detection of the heads 5a and 5b. When further rotated from this state, such electric noise as is shown in FIG. 15d will be generated by way of the contact state (See FIG. 11) of the conductor 72a larger in the center angle with the brushes 7a and 7b. FIG. 14 shows that the rotary cylinder 5 rotates from the state in FIG. 13 and the other slit part between the conductors 72b and 72a forming the commutator is in contact with the conductive brushes 7a and 7b. Also, at this time, the head 5a will not be in contact with the tape 40 and will not detect the signal but the other head 5b hard to be influenced by the electric noise will be in contact with the tape 40 and will detect the signal. Therefore, the electric noise generated at this time will not influence the signal detection of the heads 5a and 5b.

FIG. 15 shows a phase relation diagram of the head detected signal, synthesized signal and electric noise generating position in the apparatus shown in FIGS. 11 to 14. In FIG. 15, (a) shows a head 5a detected signal, (b) shows a head 5b detected signal, (c) shows a synthesized signal of the detected signal of (a) and the detected signal of (b) obtained by switching the heads and (d) shows an electric noise generated by the slit part of the commutator comprising the conductors 72a and 72b.

As the two slits of the commutator exist in a position which has passed a rotation angle of 270 degrees from the first slit and in a position which has further passed 90 degrees from that position, the electric noise shown in FIG. 15 (d) will be generated whenever the rotary cylinder 5 rotates by 270 and 360 degrees from the first slit position. This is a position in which the head 5a has rotated by 225 degrees (shown in FIG. 14) and 315 degrees (shown in FIG. 13) from the time point A at which the head 5a contacts the tape 40. In this position, the head 5a will be in a phase relation in which the head 5a will not contact the tape 40 (that is, will not detect the signal). On the contrary, in the phase relation in which the head 5a will contact the tape 40 (that is, will detect the signal), no electric noise will be generated and, as shown in FIG. 15 (a), no noise will be generated in the detected signal of the head 5a. Also, because the head 5b is on the side opposed by 180 degrees to the lead wires 13, connector 21 and relay lead 21a, as shown in FIG. 15(b), no noise will be generated in the detected signal of the head 5b. Therefore, as shown in FIG. 15c, no noise will be generated in the head synthesized signal obtained by switching the heads 5a and 5b.

Thus, because the center angle of one of the conductors of the commutator combining a plurality of conductors is formed to be larger than the tape winding angle and the position of the slit part between the conductors, the connecting positions of the lead wires connected from the conductive brushes and commutators to the electronic circuit of the rotary cylinder and the position of the magnetic head are arranged to not influence the head synthesized signal used finally as an output. When the brushes 7a and 7b contact the slits existing on the commutators 7c and 7d, electromagnetic waves will be generated around the lines electrically connected from the commutators 7c and 7d to the electronic circuits mounted on the preamplifier substrate 26, and even if the electromagnetic waves plunge into the head 5a nearby these lines, because the rotational phase of the head 5a is not detecting the signal of the tape 40, no noise will be generated in the head synthesized signal obtained as a result. Therefore, even if the commutator is formed of a plurality of conductors, the noise will be able to be prevented from influencing the head synthesized signal by the contact resistance.

As described above, according to the present invention, the commutator assembly in the rotary cylinder power feeding apparatus can be made easy and the commutator can be simplified with respect to the rotary cylinder shaft and brushes with a simple formation. Further, without increasing the number of parts, the electronic circuit of the preamplifier can be connected and the rotating operation can be transmitted by the rotary cylinder. Also, the productivity can be improved without losing reliability and, at the same time, the power can be securely fed to the electronic circuit of the preamplifier. Further, a signal noise caused by the contact noise of the conductive brushes and the commutator formed of a plurality of conductors can be prevented from being generated.

In the above described embodiments, the magnetic recording and reproducing apparatus wherein two magnetic heads are arranged as opposed to each other on the rotary surface of the rotary cylinder 5 has been explained. However, the present invention is not limited to this but can be applied to a magnetic recording and reproducing apparatus provided with one or more magnetic heads.

Also, in the above described embodiments, the VTR has been explained as a magnetic recording and reproducing apparatus. However, the present invention is not limited to this but can be applied also to such apparatus for recording and reproducing information signals by means of a rotary cylinder as, for example, a digital audio tape recorder (DAT).

The present invention is not limited to only the above described embodiments but can be variously modified without deviating from the subject matter of the invention, as defined in the appended claims.

What is claimed is:

1. A rotary cylinder power feeding apparatus, comprising:

a rotary cylinder provided with a magnetic head and an electronic circuit to be electrically connected to said magnetic head;

a columnar rotor rotating with said rotary cylinder;

a plurality of conductive members, each of said conductive members comprising a plurality of conductors, wherein:

said conductive members are arranged in an axial direction on an outer peripheral surface of said columnar rotor with gaps between each of said conductive members so as not to create a short circuit therebetween, said plurality of conductors for each of said conductive members are arranged with respect to one another in a circumferential direction on an outer peripheral surface of said columnar rotor at a same axial position, and all of said plurality of conductors for each of said conductive members are electrically connected to said electronic circuit; and conductive brushes arranged so as to come into contact with said conductive members and to feed power to said electronic circuit through said conductive members.

2. A rotary cylinder power feeding apparatus, comprising:

a rotary cylinder provided with a magnetic head and an electronic circuit to be electrically connected to said magnetic head;

a rotary driving member coupled to and rotating coaxially with said rotary cylinder;

a supporting member;

a columnar rotor rotatably attached to said supporting member so that when said supporting member is positioned within said apparatus, said columnar rotor is positioned coaxially with and is rotated by said rotation of said rotary driving member and rotates relative to said supporting member and so that when said supporting member is removed from said apparatus, said columnar rotor is removed therewith;

conductive members provided on an outer peripheral surface of said columnar rotor and electrically connected to said electronic circuit;

conductive brushes attached to said supporting member, said conductive brushes contacting said conductive members to feed power to said electronic circuit; and rotation transmitting means, which is provided between said rotary driving member and said columnar rotor, for transmitting the rotation of said rotary driving member to said columnar rotor.

3. A rotary cylinder power feeding apparatus according to claim 2, wherein:

said columnar rotor includes a rotary shaft;

said rotary driving member is formed to rotatably support said rotary shaft; and said rotation transmitting means is formed of resilient pieces provided on one of said rotary driving member and said columnar rotor and a plurality of grooves are formed radially from the other of said rotary driving member and said columnar rotor so as to engage with said resilient pieces.

4. A rotary cylinder power feeding apparatus, comprising:

a chassis;

a fixed cylinder fixed to said chassis;

a fitting member provided in said chassis;

a columnar rotor;

a power feeding terminal provided on said chassis a rotary cylinder including a magnetic head and an electronic circuit which is electrically connected to said magnetic head, said rotary cylinder being rotatable with respect to and postioned coaxially with said fixed cylinder;

a supporting member having a first end and a second end, said first end being removably coupled to said fitting member and said second end attached to said columnar rotor so that when said first end is coupled to said fitting member said columnar rotor rotates relative to said supporting member and rotates coaxially with said rotary cylinder and so that when said supporting member is removed from said apparatus, said columnar rotor is removed therewith;

conductive members provided on an outer peripheral surface of said columnar rotor and electrically connected with said electronic circuit when said first end of said supporting member is coupled to said fitting member;

conductive connecting terminals arranged at said first end of said supporting member and electrically connected with said power feeding terminal when said first end of said supporting member is coupled to said fitting member; and conductive brushes arranged on said second end of said supporting member and in contact with said conductive members, said conductive brushes being electrically connected with said conductive connecting terminals to feed power to said electronic circuit.

5. A rotary cylinder power feeding apparatus, comprising:

a rotary cylinder provided with a magnetic head and an electronic circuit to be connected to said magnetic head;

a columnar rotor rotating integrally with said rotary cylinder;

a plurality of conductive members, each of said conductive members comprising a plurality of conductors, wherein:

said conductive members are arranged in an axial direction on an outer peripheral surface of said columnar rotor with gaps between each of said conductive members so as not to create a short circuit therebetween, said plurality of conductors for each of said conductive members are arranged with respect to one another in a circumferential direction on an outer peripheral surface of said columnar rotor at a same axial position, and all of said plurality of conductors for each of said conductive members are electrically connected to said electronic circuit;

connecting means electrically connecting said conductive members with said electronic circuit; and conductive brushes fitted to contact said conductive members to feed power to said electronic circuit through said conductive members, wherein:

a center angle of one of said plurality of conductors is formed to be larger than a tape winding angle when a tape-like recording medium is wound on said rotary cylinder, said connecting means is arranged near said magnetic head, and said plurality of conductors are arranged on said outer peripheral surface of said columnar rotor so that a gap formed between two of said plurality of conductors of a same one of said plurality of conductive members contacts said conductive brushes in a magnetic head rotating position in which said magnetic head will not detect a signal from said tape-like recording medium.

6. A rotary cylinder power feeding apparatus, comprising:

a rotary cylinder;

a first magnetic head and a second magnetic head opposingly arranged on a rotary peripheral surface of said rotary cylinder;

an electronic circuit connected to one of said first magnetic head and said second magnetic head;

a columnar rotor rotating integrally with said rotary cylinder;

a plurality of conductive members, each of said conductive members comprising a plurality of conductors, wherein:

said conductive members are arranged in an axial direction on an outer peripheral surface of said columnar rotor with gaps between each of said conductive members so as not to create a short circuit therebetween, said plurality of conductors for each of said conductive members are arranged with respect to one another in a circumferential direction on an outer peripheral surface of said columnar rotor at a same axial position, and all of said plurality of conductors for each of said conductive members are electrically connected to said electronic circuit;

connecting means electrically connecting said electronic circuit with said conductive members; and conductive brushes fitted to contact said conductive members and to feed power to said electronic circuit through said conductive members, wherein:

a center angle of one of said plurality of conductors is formed to be larger than a tape winding angle when a tape-like recording medium is wound on said rotary cylinder, said connecting means is arranged near said first magnetic head, and said plurality of conductors are arranged on said outer peripheral surface of said columnar rotor so that a gap formed between two of said plurality of conductors contacts said conductive brushes in a first magnetic head rotating position in which said first magnetic head does not detect a signal from said tape-like recording medium.

* * * * *